United States Patent [19]
Fujii et al.

[11] Patent Number: 5,911,033
[45] Date of Patent: Jun. 8, 1999

[54] DIGITAL VIDEO SIGNAL RECORDING APPARATUS USING VARIABLE-LENGTH CODING

[75] Inventors: Akio Fujii; Masahiko Enari; Yoshifumi Satake, all of Kanagawa-ken, Japan

[73] Assignee: Canon Kabushiki Kaisha, Tokyo, Japan

[21] Appl. No.: 08/465,603

[22] Filed: Jun. 5, 1995

Related U.S. Application Data

[63] Continuation of application No. 08/303,145, Sep. 8, 1994, abandoned, which is a continuation of application No. 07/980,654, Nov. 24, 1992, abandoned.

[30] Foreign Application Priority Data

Nov. 29, 1991 [JP] Japan .................................. 3-340006
May 18, 1992 [JP] Japan .................................. 4-125036

[51] Int. Cl.$^6$ .............................. H04N 5/917; H04N 5/91
[52] U.S. Cl. ............................................. 386/109; 386/81
[58] Field of Search .................................. 358/335, 311, 358/313, 338, 342; 348/784; 360/32, 13, 14.1; 386/109, 111, 112, 27, 33, 114, 107, 117, 125, 126, 81

[56] References Cited

U.S. PATENT DOCUMENTS

| | | | |
|---|---|---|---|
| 4,920,426 | 4/1990 | Hatori et al. | 358/433 |
| 5,122,886 | 6/1992 | Tanaka | 358/335 |
| 5,160,437 | 11/1992 | Yonemitsu et al. | 358/342 |
| 5,175,631 | 12/1992 | Juri et al. | 358/335 |

*Primary Examiner*—Robert Chevalier
*Attorney, Agent, or Firm*—Robin, Blecker & Daley

[57] ABSTRACT

In a digital video signal recording apparatus of the kind arranged to output a coded signal with its length per picture arranged to be variable by compressing the amount of information of the digital video signal and to record the coded signal while forming many tracks in parallel on a tape-shaped recording medium, a compression ratio is adjusted in such a way as to make the coded signal corresponding to m pictures (m: an integer of 2 or more) have an amount of information recordable in n tracks (n: an integer of 1 or more).

20 Claims, 7 Drawing Sheets

DIGITAL VIDEO SIGNAL RECORDING APPARATUS USING VARIABLE-LENGTH CODING

This is a continuation application under 37 CFR 1.62 of prior application Ser. No. 08/303,145, now abandoned and filed Sep. 8, 1994, and which is a continuation of Ser. No. 07/980,654 filed Nov. 24, 1992 now abandoned.

BACKGROUND OF THE INVENTION

1. Field of the Invention

This invention relates to a digital video signal recording apparatus, and more particularly to an apparatus for recording a variable-length coded digital video signal on a tape-shaped recording medium.

2. Description of the Related Art

In transmitting and recording a large amount of digital video data, it has been practiced to transmit and record the digital video data by compressing it through a high-efficiency coding process for efficient transmission and for reducing the amount of data to be recorded on a recording medium. For the high-efficiency coding process, it is a general tendency to adopt a variable-length coding method which excels in compressing efficiency.

The amount of information carried by digital video data handled, for example, by a high-picture-quality TV system which is becoming popular these days is five times as much as that of the data of the NTSC system. It is, therefore, being attempted to efficiently compress such a large amount of data by variable-length coding. Meanwhile, recording/reproducing apparatuses such as a digital VTR, a disc recording/reproducing apparatus and the like are now being arranged to be capable of recording data obtained by compressing such digital video data on a magnetic recording medium such as a magnetic tape.

However, in recording the digital video data in recording tracks on the recording medium after compressing the data by variable-length coding with the recording and reproducing apparatuses of the above-stated kind, the compressed amount of data obtained after compression by the variable-length coding is not uniform. It is, therefore, difficult to completely record the whole compressed data in each recording track which has a fixed recording capacity. The inconsistency of the compressed amount of data thus makes editing work of varied kinds such as tag recording and other special reproducing operations difficult.

To solve this problem, the code length of data can be adjusted by adjusting a quantizing parameter for the data to be variable-length coded, in carrying out the variable-length coding. For example, in a case where the variable-length coding is to be carried out by utilizing the known DCT (discrete cosine transform) process DCT transformed data is subject to the variable-length coding. It is known that, in this instance, the amount of data to be obtained after the variable-length coding is adjustable by adjusting a parameter to be used for quantization of the DCT transformed data.

The adjustment of the amount of data after the variable-length coding process can be made by using the DCT blocks as the units of adjustment. However, a change in the quantizing parameter brings about a change in the resolution of the applicable part. For example, an attempt to suppress the amount of the variable-length coded data to an amount below a given amount for every DCT block or for every picture, results in it being hardly possible to obtain a stably reproduced images, because of excessive fluctuations of picture quality among blocks or pictures.

SUMMARY OF THE INVENTION

This invention is directed to the solution of the above-stated problems of the prior art.

It is, therefore, an object of this invention to provide a digital video signal recording apparatus which is arranged to be capable of compressing video data with a high compression ratio, without causing any differences in picture quality among pictures and to facilitate editing.

Under this object, a video signal recording apparatus arranged as an embodiment of this invention comprises input means for inputting a digital video signal; variable-length coding means arranged to compress the amount of information of the digital video signal and to output a coded signal having a variable length per unit amount of information; and recording means for recording the coded signal on a tape-shaped recording medium while forming many tracks in parallel on the recording medium, wherein the variable-length coding means is arranged to adjust a compression ratio thereof in such a way as to make the coded signal corresponding to the digital video signal for m pictures (m: an integer of 2 or more) have an amount of information recordable in n tracks (n: an integer of 1 or more), and to allow the amount of information of the coded signal corresponding to the digital video, signal for one picture to be variable.

The above and other objects and features of this invention will become apparent from the following detailed description of embodiments thereof taken in conjunction with the accompanying drawings.

DETAILED DESCRIPTION OF THE PREFERRED EMBODIMENTS

Figure 1:
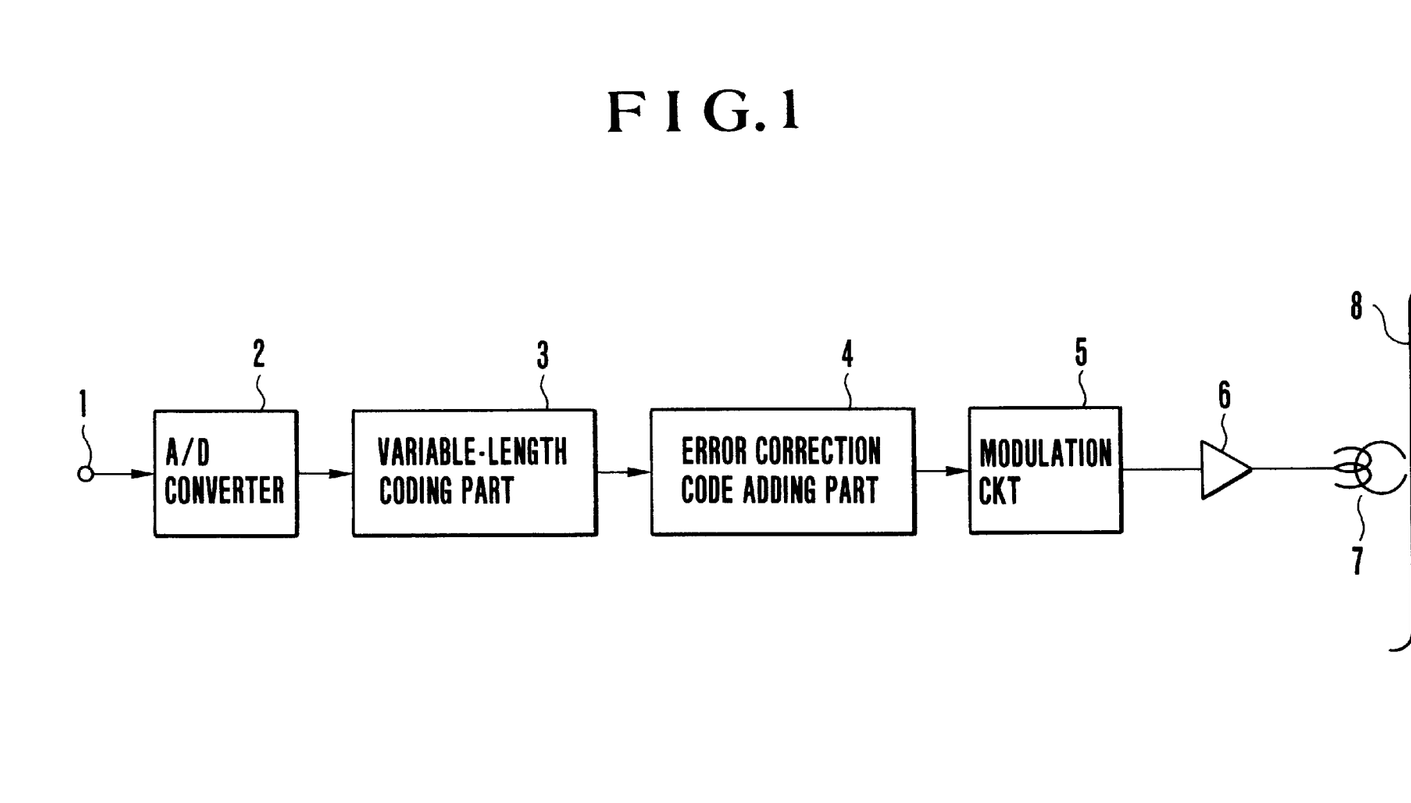
FIG. 1 is a block diagram showing in outline the arrangement of the recording system of a digital VTR which is arranged as an embodiment of this invention.
Figure 2:
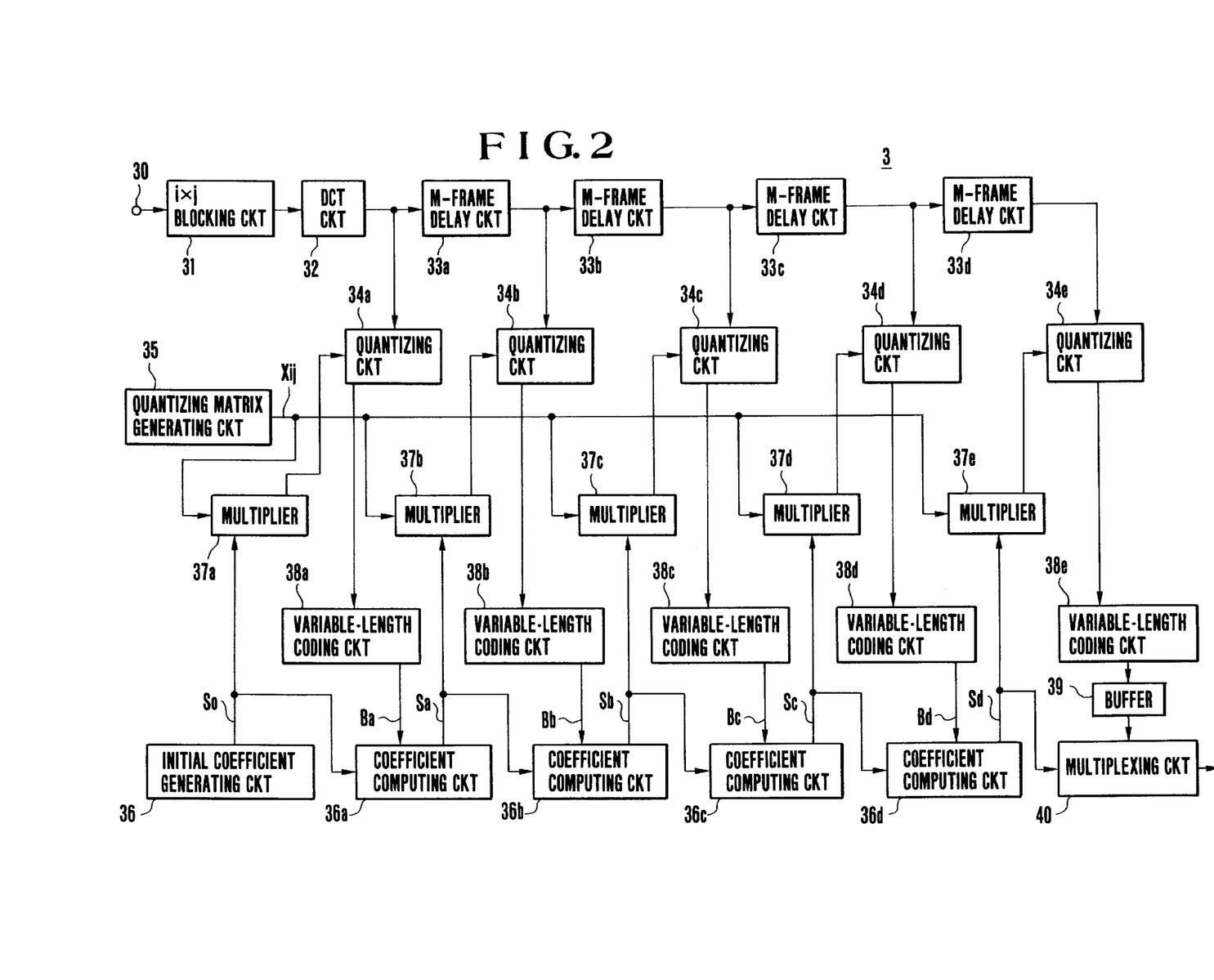
FIG. 2 is a block diagram showing by way of example the arrangement of a variable-length coding circuit included in the VTR shown in FIG. 1.

FIG. 1 shows the arrangement of the recording system of a digital VTR to which this invention is applied as an embodiment thereof. FIG. 2 shows in detail the arrangement of a variable-length coding part 3 which is included in the VTR shown in FIG. 1.

Referring to FIG. 1, an analog video signal is inputted to an input terminal 1 from a camera, another VTR or the like. This video signal is converted by an A/D converter 2 into digital video data. This digital video data is applied to a variable-length coding part 3. As will be described later with reference to FIG. 2, the variable-length coding part 3 is arranged to encode digital video data for M frames by compressing it into an amount of data of $A_M$ bits which are less than the total recording capacity of $A_N$ bits of N tracks to be formed on the magnetic tape.

The data thus compressed is sent to an error correction code adding circuit 4. The circuit 4 adds an error correction code to the compressed data. After that, the compressed data is applied to a modulation circuit 5 to be modulated in a predetermined manner. The modulated signal is amplified by a recording amplifier 6. The amplified signal is recorded by a recording head 7 in an oblique recording track on a magnetic tape 8.

Figure 3:
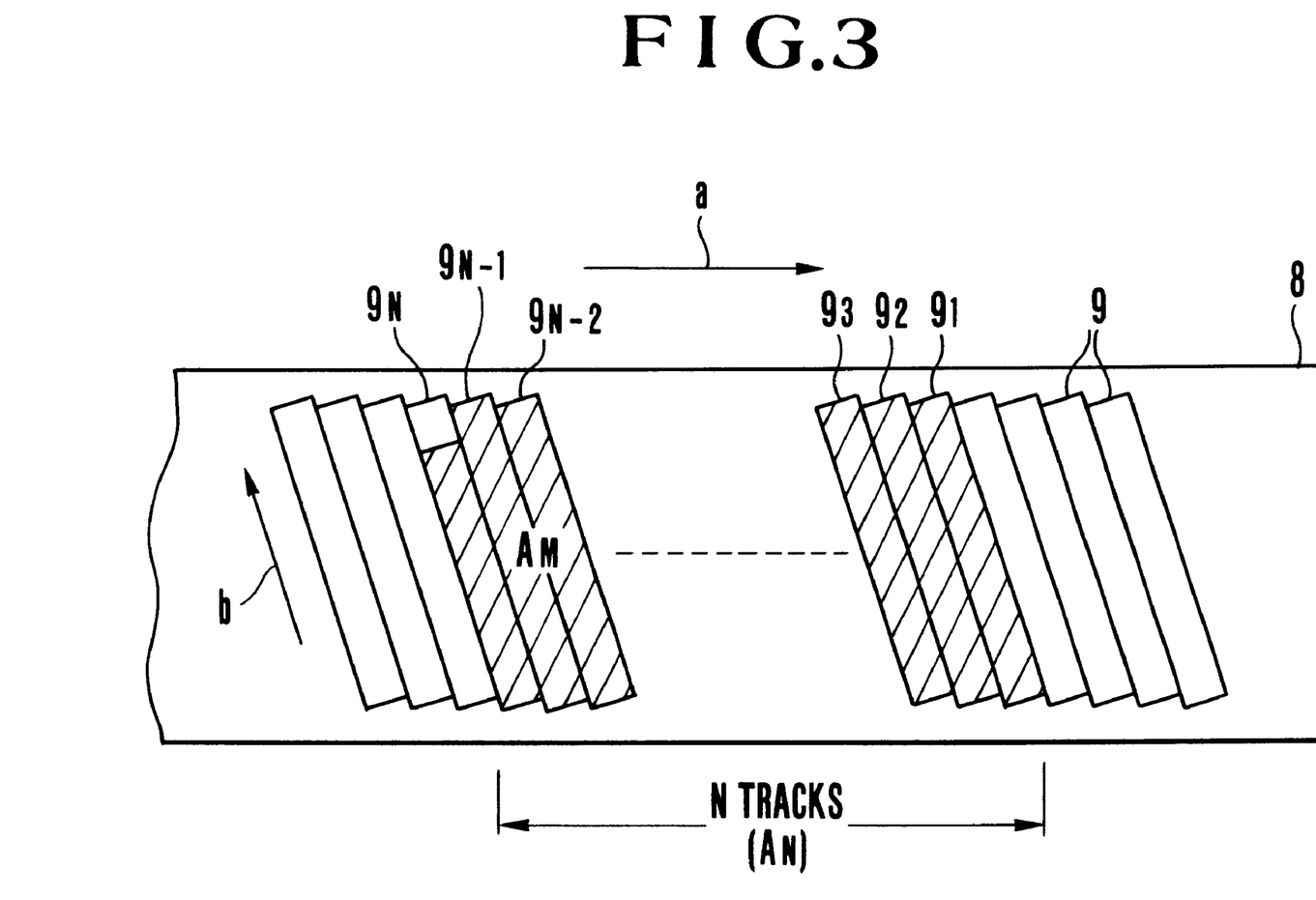
FIG. 3 shows a recording pattern obtained on a tape by the digital VTR shown in FIG. 1.

FIG. 3 shows a recording pattern thus obtained on the magnetic tape 8. In FIG. 3, an arrow "a" denotes the traveling direction of the magnetic tape 8 and another arrow "b" denotes the scanning direction of the magnetic head 7. Recording tracks 9 are formed in parallel and obliquely relative to the traveling direction "a" of the magnetic tape 8. Of these tracks, data of $A_M$ bits obtained by compressing the digital video data for M frames is recorded in N tracks $9_1$, $9_2$, - - - $9_N$ which have a total recording capacity of $A_N$ bits and is indicated by hatching in FIG. 3. In other words, the whole digital video data for M frames is thus arranged to be completely recorded within the N tracks. This arrangement enables the operator to perform such operations as tag recording, editing and special reproducing operations in units of N tracks.

The following describes by way of example the details of the above-stated variable-length coding part 3 with reference to FIG. 2:

Referring to FIG. 2, an input terminal 30 is arranged to input the digital video data outputted from the A/D converter 2 shown in FIG. 1. A blocking circuit 31 is arranged to divide picture element data of the digital video data into blocks, each of which consists of i×j picture elements. A DCT circuit 32 is arranged to form transformed data in units of block composed of i×j picture elements by orthogonally transforming the blocks of digital video data through a discrete cosine transform process. Delay circuits 33a, 33b, 33c and 33d are arranged to delay the data transformed by the DCT circuit 32 respectively by M frames one after another. Quantizing circuits 34a, 34b, 34c, 34d and 34e are arranged to quantize respectively the data outputted from the DCT circuit 32 and the delay circuits 33a to 33d.

A quantizing matrix generating circuit 35 is arranged to generate an element $X_{ij}$ of a quantizing matrix to be used in quantizing the above-stated transformed data obtained in each of the blocks. An initial coefficient generating circuit 36 and coefficient computing circuits 36a, 36b, 36c and 36d are respectively arranged to generate an initial coefficient So and coefficients Sa, Sb, Sc and Sd. The coefficients So, Sa, Sb and Sc are arranged to be applied respectively to the coefficient computing circuits 36a to 36d.

Multipliers 37a, 37b, 37c, 37d and 37e are arranged to multiply the above-stated coefficients So, Sa to Sd respectively by the above-stated element $X_{ij}$ and to supply their multiplication outputs as quantizing tables to the quantizing circuits 34a to 34e. Variable-length coding circuits 38a, 38b, 38c, 38d and 38e are arranged to compress the quantized data from the quantizing circuits 34a to 34e by variable-length coding. The variable-length coding circuits 38a to 38d are arranged to compute amounts Ba, Bb, Bc and Bd of the compressed data and to supply these amounts of the compressed data to the coefficient computing circuits 36a to 36d, respectively.

Data which has been compressed and coded by the variable-length coding circuit 38e is applied to a buffer 39. A multiplexing circuit 40 is arranged to multiplex the data from the buffer 39 with a coefficient Sd which is computed and generated by the coefficient computing circuit 36d. An output terminal 41 is arranged to send multiplexed data obtained from the multiplexing circuit 40 to the error correction code adding circuit 4 shown in FIG. 1.

The digital VTR arranged in the above-stated manner operates as described below:

The digital video data inputted to the input terminal 30 is supplied to the blocking circuit 31. At the blocking circuit 31, video data conforming to raster scanning is divided into blocks each composed of i×j picture elements. The data thus divided into blocks are applied to the DCT circuit 32 to be orthogonally transformed by the discrete cosine transform process and to be transformed into a frequency domain ranging from a low frequency to a high frequency. The output of the DCT circuit 32 is applied in blocks each composed of i×j picture elements to the quantizing circuit 34a.

Meanwhile, the initial coefficient generating circuit 36 generates a given initial coefficient So and applies it to the multiplier 37a and the coefficient generating circuit 36a. The multiplier 37a multiplies by the initial coefficient So each of the elements $X_{ij}$ of the quantizing matrix generated by the quantizing matrix generating circuit 35. A multiplication output ($X_{ij}$×So) thus obtained is supplied as a quantizing table to the quantizing circuit 34a.

The quantizing circuit 34a quantizes the data which has been transformed to the above-stated frequency domain by the DCT circuit 32. The quantized data is variable-length coded by the variable-length coding circuit 38a. An amount Ba of the coded data is computed and is sent to the coefficient computing circuit 36a. The coefficient computing circuit 36a then computes and obtains a coefficient Sa from the amount Ba of the coded data and the initial coefficient So in such a way as to make the the coefficient Sa larger than the initial coefficient So when the amount Sa is larger than a desired amount of data and make the coefficient Sa smaller than the initial coefficient So when the amount Ba is smaller than the desired amount of data. The coefficient Sa thus obtained is sent to the coefficient computing circuit 36b and the multiplier 37b.

The multiplier 37b multiplies by the coefficient Sa each of the elements $X_{ij}$ outputted from the quantizing matrix generating circuit 35. The multiplication output ($X_{ij}$×Sa) thus obtained is supplied to the quantizing circuit 34b as a quantizing table. The quantizing circuit 34b quantizes, by using this table, the transformed data which is delayed as much as M frames by the delay circuit 33a. The quantized data thus obtained is sent to the variable-length coding circuit 38b. The variable-length coding circuit 38b variable-length codes the quantized data. The amount Bb of the coded data is computed and is then sent to the coefficient computing circuit 36b.

The coefficient computing circuit 36b computes a coefficient Sb from the amount Bb of the coded data and the coefficient Sa coming from the coefficient computing circuit 36a in such a way as to make the coefficient Sb larger than the coefficient Sa when the amount Bb is larger than a desired amount of data and make the coefficient Sb smaller than the coefficient Sa when the amount Bb is smaller than the desired amount of data. The coefficient Sb thus obtained is sent to the coefficient computing circuit 36c and the multiplier 37c.

After that, the multipliers 37c, 37d and 37e multiply the elements $X_{ij}$ of the quantizing matrix by the coefficients Sb, Sc and Sd supplied from the coefficient computing circuits 36b, 36c and 36d and supply the results of mutliplication to the quantizing circuits 34c, 34d and 34e as quantizing tables respectively in the same manner as the multiplier 37b. The quantizing circuits 34c, 34d and 34e quantize the transformed data delayed respectively as much as M frames through the delay circuits 33b, 33c and 33d one after another. The quantized transformed data is then supplied respectively to the variable-length coding circuits 38c, 38d and 38e.

The variable-length coding circuits 38c, 38d and 38e perform variable-length coding on the quantized data supplied. The variable-length coding circuits 38c and 38d compute respectively the amounts Bc and Bd of the data thus coded. The amounts Bc and Bd thus obtained are sent respectively to the coefficient computing circuits 36c and 36d.

The coefficient computing circuits 36c and 36d compute coefficients Sc and Sd respectively on the basis of the amounts Bc and Bd and the coefficients Sb and Sc sent from the coefficient computing circuits 36b and 36c. The coefficients Sc and Sd which are thus obtained are sent respectively to the multipliers 37d and the coefficient computing circuit 36d and to the multiplier 37e and the mutliplexing circuit 40. The variable-length coding circuit 38e sends the coded data to the multiplexing circuit 40 via the buffer 39. The mutliplexing circuit 40 then multiplexes the coded data obtained by using the coefficient Sd with the coefficient Sd coming from the coefficient computing circuit 36d. The output of the multiplexing circuit 40 is outputted from the output terminal 41 as compressed data.

The amount of the data variable-length coded by using the coefficient Sd is converged nearly to a desired amount of data. If the desired amount of data is set to an amount a little less than the amount $A_N$ of data for N tracks, the amount of the data variable-length coded by using the coefficient Sd becomes an amount which is less than and near to the amount $A_N$.

In the embodiment, as described above, a plurality of transformed data which have been serially delayed as much as M frames at a time is processed in parallel to gradually compress the amount of the coded data into a desired amount of data. At the time of outputting from the output terminal 41, the amount $A_M$ of data for M frames thus has been adjusted to an amount of data which is equal to or less than the recording capacity $A_N$ of the N tracks on the magnetic tape 8. Further, the arrangement to process the plurality of transformed data in parallel enables the data to be processed in real time.

In accordance with the arrangement of the digital VTR described above with reference to FIGS. 1, 2 and 3, the coding process is carried out in such a way as to make the amount $A_M$ of the coded video data for M frames to be equal to or less than the recording capacity $A_N$ of N tracks of the recording medium. The arrangement thus ensures that the whole M frames can be completely recorded in N tracks on the recording medium. Therefore, editing work on video images can be easily carried out. Further, since the compression ratio for each frame is arranged to have a fair amount of latitude, recording can be accomplished with stable picture quality.

Figure 4:
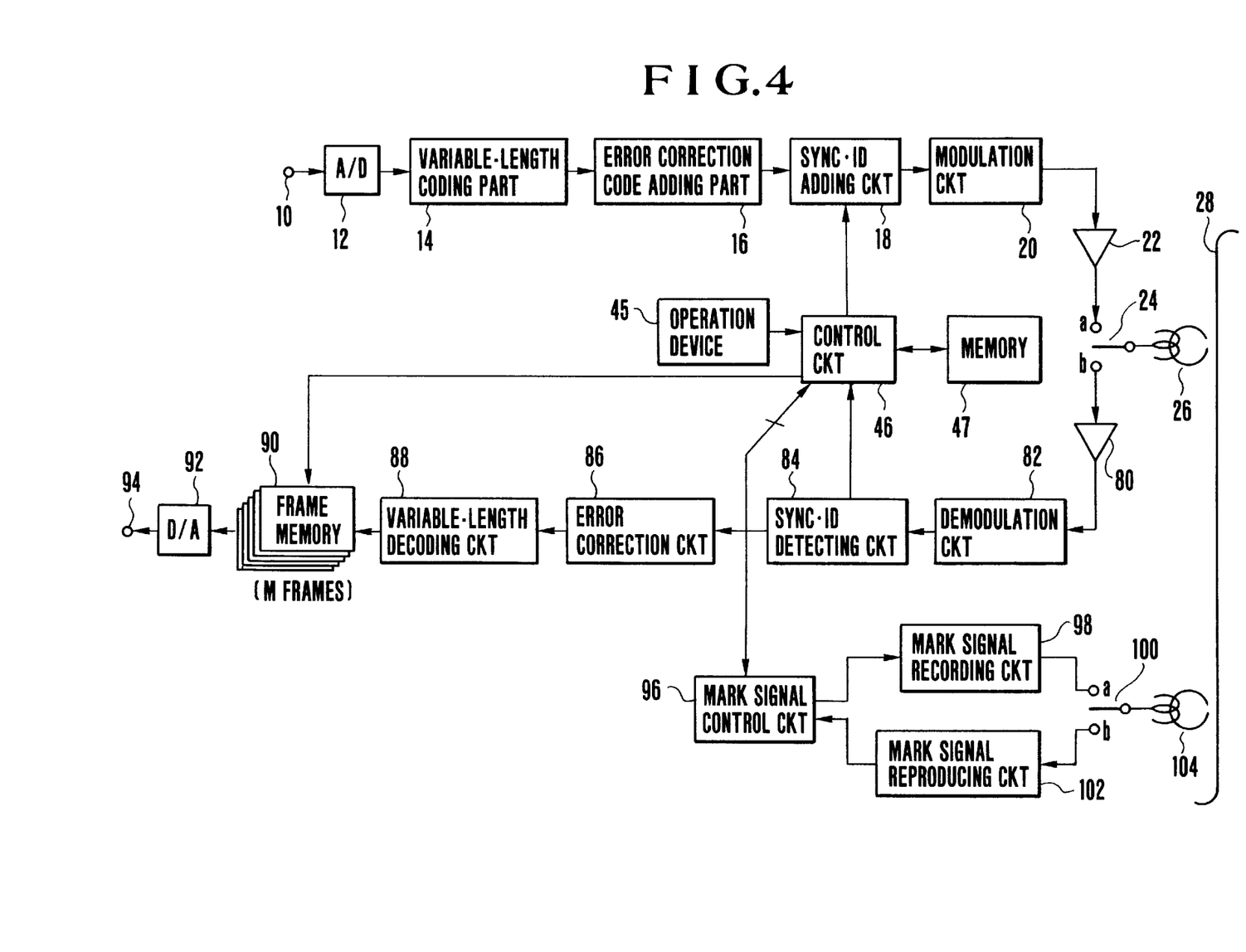
FIG. 4 is a block diagram showing in outline the arrangement of a digital VTR which is arranged as another embodiment of this invention.

Another embodiment of this invention is described below with reference to the drawings:

FIG. 4 is a block diagram showing in outline the arrangement of a digital VTR which is arranged as another embodiment of this invention. This digital VTR is also arranged to record video data for M (M: an integer which is 2 or more) frames or fields in N (N: an integer which is 1 or more) tracks. Tag recording is arranged to be carried out in units of N tracks. Editing work or special reproduction is arranged to be carried out also in units of N tracks as necessary.

Referring to FIG. 4, an input terminal 10 is arranged to input an analog video signal to be recorded. An A/D converter 12 is arranged to convert into digital video data the analog video signal coming from the input terminal 10. A variable-length coding circuit 14 is arranged to variable-length code the digital video data for M frames coming from the A/D converter 12 and to compress it into an amount Am of data (Mbits) which is equal to or less than the recording capacity An (Mbits) of N tracks on a magnetic tape 28. An error correction code adding circuit 16 is arranged to add an error correction code to the output of the variable-length coding circuit 14. A sync.ID adding circuit 18 is arranged to make the output of the error correction code adding circuit 16 into synchronous blocks and to add a synchronizing code Sync for detection of synchronism and an identification information ID to the output of the circuit 16. The identification information ID includes the address of video image information and the parameters of compression, such as compression ratio, etc.

A modulation circuit 20 is arranged to transform the output of the sync.ID addition circuit 18 to a low frequency by suppressing it at a rate of 8–10 or 8–14 conversion. A recording amplifier 22 is arranged to amplify the output of the modulation circuit 20. A switch 24 is arranged to have its connecting position on the side of a contact "a" in a recording mode and on the side of another contact "b" in a reproduction mode. Reference numeral 26 denotes a recording/reproducing magnetic head. Reference numeral 28 denotes a magnetic tape which is employed as a recording medium.

Reference numeral 80 denotes a reproduction amplifier. Reference numeral 82 denotes a demodulation circuit corresponding to the modulation circuit 20. A sync.ID detecting circuit 84 is arranged to detect a synchronizing code Sync and an identification information ID. An error correction circuit 86 is arranged to correct any error in the data part supplied from the sync.ID detecting circuit 84 by means of an error correction code. A variable-length decoding circuit 88 is arranged to decode the variable-length coded video data after any error of it is corrected by the error correction circuit 86. A frame memory 90 is arranged to have a storage capacity for an amount of video data for M frames and to store the video data after it has been decoded by the variable-length decoding circuit 88. A D/A converter 92 is arranged to convert the video data read out from the frame memory 90 into an analog signal. An output terminal 94 is arranged to output to the outside the reproduced analog video signal outputted from the D/A converter 92. Further, a mark signal control circuit 96 is arranged to generate a mark signal as will be described later and to decode a mark signal reproduced. Reference numeral 98 denotes a mark signal recording circuit. Reference numeral 100 denotes a recording/reproduction change-over switch. Reference numeral 102 denotes a mark signal reproducing circuit. Reference numeral 104 denotes a fixed head.

An operation device 45 is provided for an editing operation. A control circuit 46 is arranged to control such editing work as tag recording in accordance with a signal coming from the operation device 45. A memory 47 is arranged to store data required by the control circuit 46, such as data which indicates a tag recording position, etc. The details of the control circuit 46 will be described later herein.

The variable-length coding circuit 14 included in this embodiment as shown in FIG. 4 may be arranged in the same manner as the variable-length coding circuit 4 described in the foregoing with reference to FIG. 2.

More specifically, the variable-length coding circuit 14 is arranged to perform a high-efficiency coding action on the video data from the A/D converter 12 in units of M frames. The error correction code adding circuit 16 is arranged to add to the output of the circuit 14 an error correction code which is, for example, a double coded Reed-Solomon code. The Sync.ID adding circuit 18 is arranged to make the output of the error correction code adding circuit 16 into synchronous blocks, to add a synchronizing code Sync for detecting synchronism and identification information ID consisting of addresses, a compressing parameter, etch, and to supply its output to the modulation circuit 20. The modulation circuit 20 is arranged to perform a low-frequency suppressing modulation process on the output of the sync.ID adding circuit 18. The output of the modulation circuit 20 is applied via the recording amplifier 22 and the switch 24 to the magnetic head 26 to be recorded on the magnetic tape 28.

Figure 5:
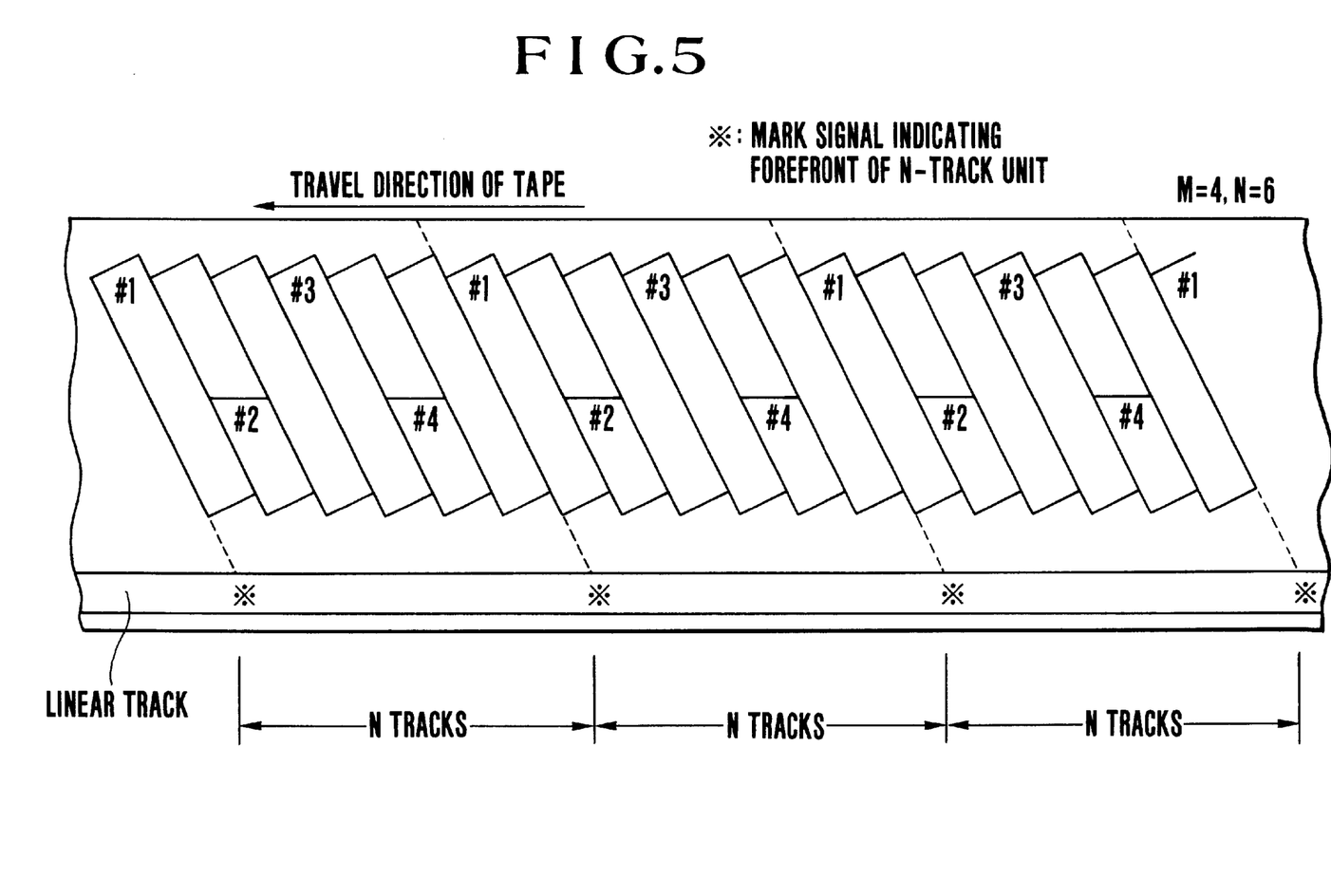
FIG. 5 shows a recording pattern obtained on a tape by the digital VTR shown in FIG. 4.

FIG. 5 shows by way of example a track pattern obtained in a case where M=4 and N=4. Referring to FIG. 5, a linear track extends on the magnetic tape 28 in the longitudinal direction thereof. In the linear track is recorded a mark signal * which indicates the position of the forefront of each N tracks. The mark signal * is generated by the mark signal control circuit 96 and is applied via the mark signal recording circuit 98 and one side "a" of the switch 100 to the fixed head 104 to be recorded in the linear track on the tape.

The compressed video data which is thus recorded on the magnetic tape 28 is reproduced by the magnetic head 26. The output of the magnetic head 26 is applied via the switch 24 and the reproduction amplifier 80 to the demodulation circuit 82 to be demodulated. The sync.ID detecting circuit 84 detects the identification information ID, the variable-length coded video data and the error correction code from the output of the demodulation circuit 82. The variable-length coded video data and the error correction code are supplied to the error correction circuit 86. In accordance with the error correction code, the error correction circuit 86 corrects any code error in the variable-length coded video data. The variable-length decoding circuit 88 then decodes the variable-length coded video data and outputs the digital video signal in its original state.

The digital video signal which is thus restored to its original state by the variable-length decoding circuit 88 is temporarily stored by the frame memory 90 which has a storage capacity for M frames. If no unnecessary reproduced video image (will be described later) is included in the digital video signal stored, the digital video signal stored is read out in the order of writing and is supplied to the D/A converter 92. The D/A converter 92 converts the video data from the memory 90 into an analog video signal. The video signal thus reproduced is outputted to the outside from the output terminal 94. Further, at this time, the mark signal which is reproduced by the fixed head 104 is supplied via one side "b" of the switch 100 and the mark signal reproducing circuit 102 to the mark signal control circuit 96.

Figure 6:
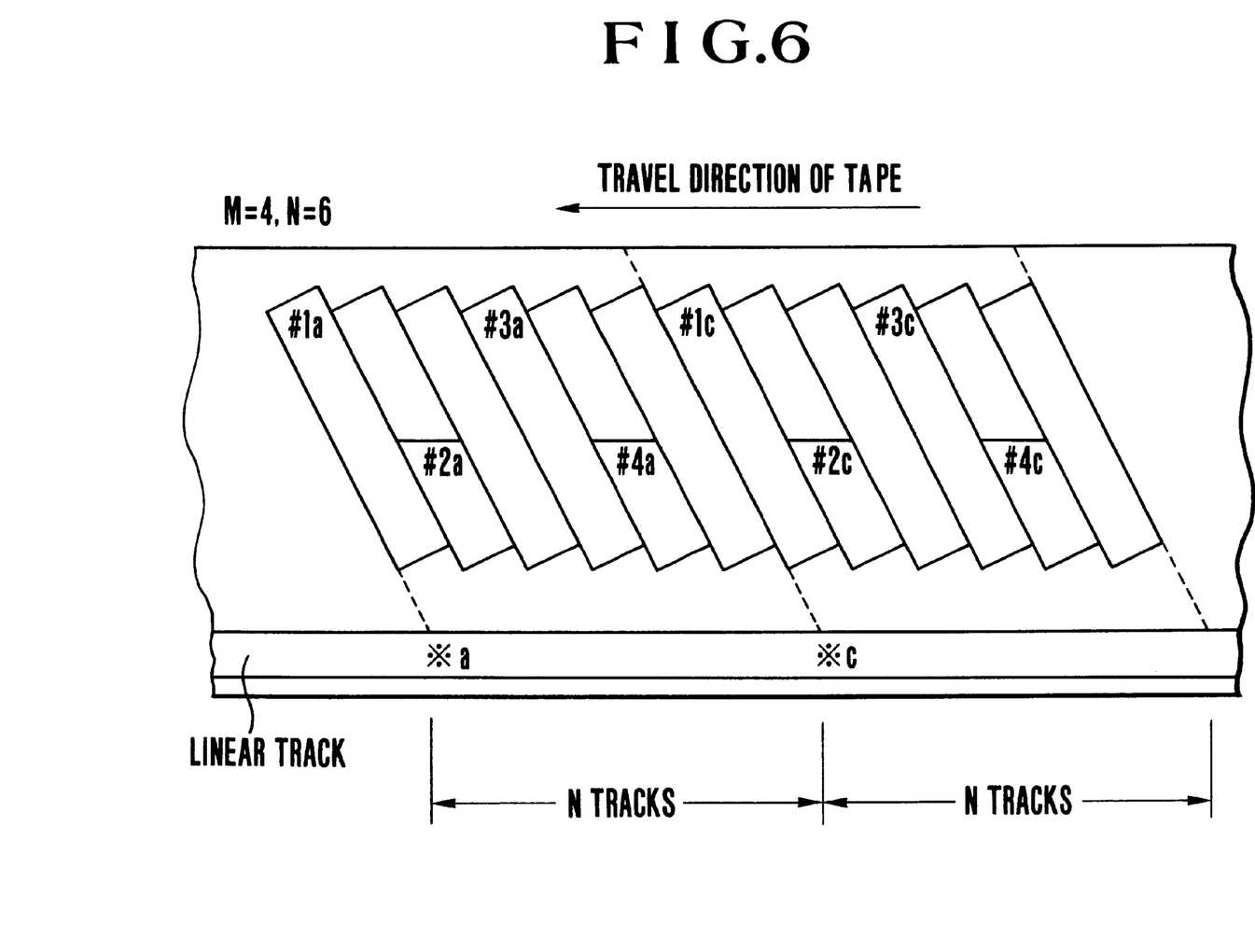
FIG. 6 shows a recording pattern obtained before tag recording is performed by the digital VTR of FIG. 4.
Figure 7:
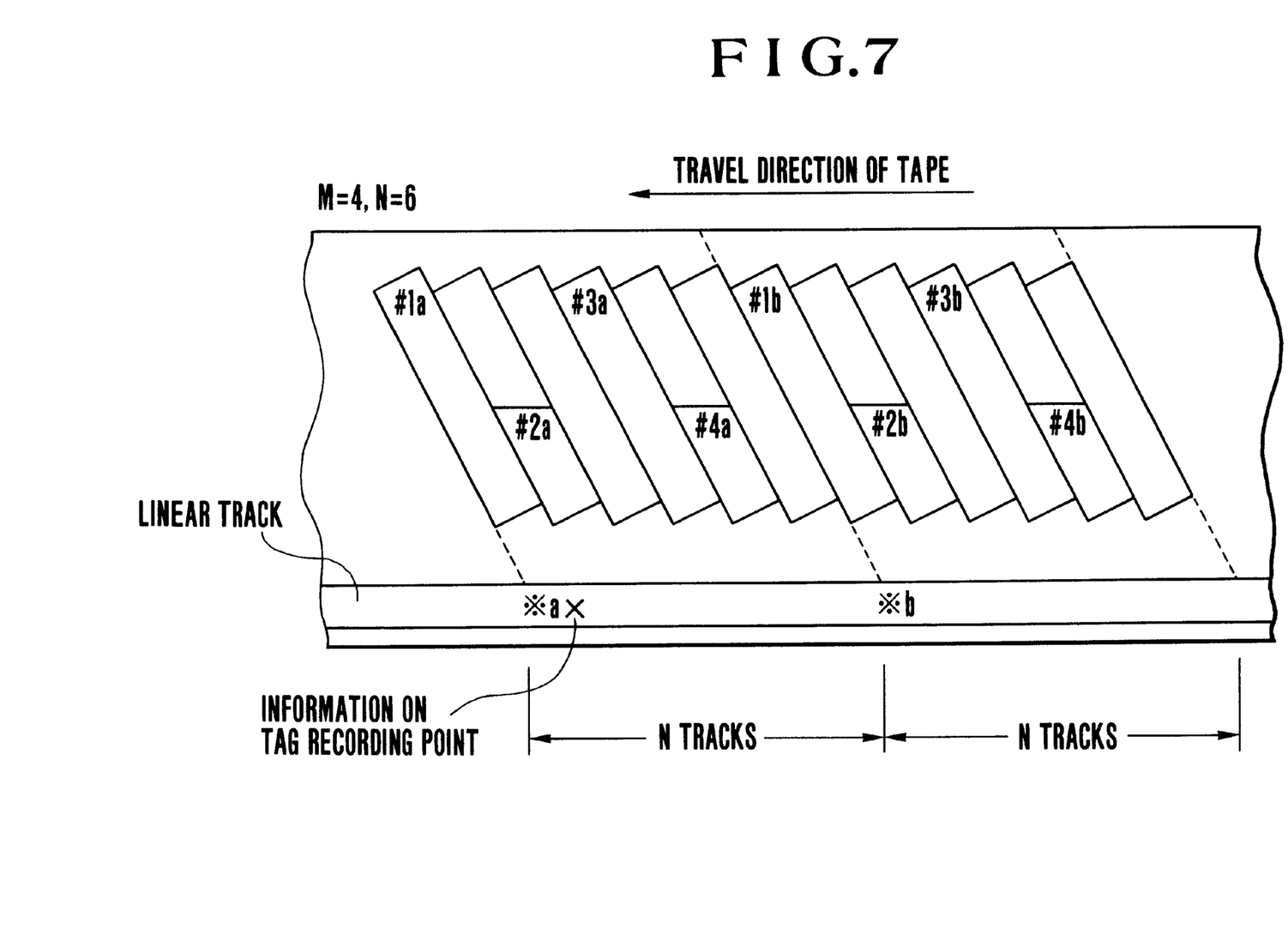
FIG. 7 shows a recording pattern obtained after tag recording is performed by the digital VTR of FIG. 4.

Next, the tag recording action by which this embodiment is characterized is described as follows: FIG. 6 shows a recording pattern obtained before editing work is performed by tag recording. FIG. 7 shows a track pattern obtained after the editing work is performed by tag recording. The following description is given on the assumption that the compressed video data of frames #1c to #4c is recorded after the compressed video data of frames #1a to #4a and that another video image is to be tag-recorded after the frame #3a under this condition.

In this instance, the magnetic tape shown in FIG. 6 is reproduced. While the recorded video image is caused to be displayed on a monitor, the operation device 45 is operated to designate the frame #3a as the frame to be followed by the tag recording. The recording switch of the operation device 45 is then operated to instruct the VTR to start recording. The control circuit 46 stores the position of the frame #3a as the end frame to be followed by the tag recording in accordance with the instruction given by the operator. The magnetic tape is rewound to a point at which a mark signal *a indicates, in the linear track on the tape, the position of the forefront of N tracks in which the frame #3a is recorded. Then, the mark signal control circuit 18 generates information specifying the end frame #3a to be followed by the tag recording. This information is recorded by the fixed head 104 in the linear track after the mark signal *a.

After that, the magnetic tape is moved by fast feeding to a point at which a mark signal *c indicates the position of the forefront of the next N tracks. After that, video signal inputs to the input terminal 10 are serially recorded. A track pattern which is thus obtained after the editing work is as shown in FIG. 7. As shown, video image frames #1b to #4b are recorded in place of the video image frames #1c to #4c. The mark signal indicative of the position of the forefront of N tracks in which the video image frames #1b to #4b are recorded is also rewritten. In a case where the identification information ID is included in the applicable mark signal, the contents thereof are of course rewritten to be pertinent to the video image frames #1b to #4b.

The mark signal indicative of the forefront of N tracks and the information specifying the end frame to be followed by tag recording may be recorded either at the fore end or rear end of each track instead of the above-stated linear track. Further, the recording and detecting actions of course may be arranged to be done by circuits other than the sync.ID adding circuit 18 and the mark signal control circuit 96.

In reproducing the records on the magnetic tape after the editing by tag recording, the VTR operates as follows: the mark signal control circuit 96 detects the information recorded on the linear track to specify the end frame which is followed by tag recording. The mark signal control circuit 96 then transfers the information to the control circuit 46. The control circuit 46 causes the information specifying the end frame followed by tag recording to be temporarily stored in the memory 47 and then monitors and controls the frame memory 90. More specifically, after the reproduced video data of the end frame followed by tag recording is written into the frame memory 90, the control circuit 46 controls the frame memory 90 in such a way as to prevent reproduced video data for a part extending up to a next mark signal indicative of the forefront of N frames from being written into the frame memory 90. In other words, in the case of FIG. 7, reproduced video data of a frame #4a is prevented from being written into the frame memory 90.

It goes without saying that the control may be changed to be performed in such a way as to cause all the the reproduced video data outputs of the variable-length decoding circuit 88 to be temporarily written into the frame memory 90, and, in reading the stored data out from the frame memory 90, the reproduced video data for the frames #1b and subsequent frames obtained by tag recording are read out after the reproduced video data of the end frame followed by the tag recording. In the case of FIG. 7, in reading the reproduced data out from the frame memory 90, the reproduced video data of the frame #4a is skipped.

In the case of the circuit shown in FIG. 2, the quantizing circuits 34a to 34e and the variable-length coding circuits 38a to 38e are arranged and connected in a multi-step manner. According to this arrangement, the amount of information must be in a state of having been compressed to a value less than a desired amount of information in the output of the variable-length coding circuit 38e. Depending on the coefficient computing operations of the coefficient computing circuits 36a to 36d, the coefficient must be set at the stage of the coefficient computing circuit 36a at such a value as to give a considerably high compression ratio. To solve this problem, the operations of the coefficient computing circuits 36a to 36d may be replaced with a loop computing operation repeatedly carried out by a microcomputer in such a way as to obtain an optimum amount of information. In the case of that modification, the quantizing circuit and the variable-length coding circuit can be arranged in a single step although it necessitates the provision of an image memory for storing image data for one picture.

Further, it is possible to have the quantizing circuits 34a to 34e and the variable-length coding circuits 38a to 38e arranged in parallel, to have the quantizing and variable-length coding processes simultaneously performed for one and the same data by using a plurality of coefficients S0 to S4 according to the desired amount of information, and to select a code of compression which gives an amount of information less than and nearest to the desired amount of information.

In other words, what is shown in FIG. 2 is nothing else but an example. The circuit arrangement of the variable-length coding circuit 14 can be variously changed. The invention is not limited to the example of the circuit arrangement shown in FIG. 2. In the circuit shown in FIG. 2 or in the modification example described above, the compression ratio may be feedback controlled by using the amount of data obtained within the buffer 39. Since the whole M frames can be completely recorded within the N tracks, this embodiment permits tag recording, editing work and special reproducing operations to be easily accomplished. Further, with the N tracks reproduced, reproduced data forming each picture never happens to be insufficient and any underflow or overflow takes place in the display of the reproduced video image.

While a magnetic tape is employed as a recording medium in the foregoing description, this invention is of course applicable also to other cases where a magnetic disc, an optical disc, an photoelectro-magnetic disc, a solid memory, etc., are employed as the recording medium.

As apparent from the foregoing, the digital VTR described with reference to FIGS. 4 to 7 facilitates tag recording, editing, special reproduction, etc., as the video images are recorded in units of N tracks. The digital VTR also prevents any overflow or underflow from taking place on the display image plane.

What is claimed is:

1. A video signal recording apparatus comprising,
   a) input means for inputting a digital video signal;
   b) variable-length coding means arranged to compress an amount of information of the digital video signal and to output a coded signal; and
   c) recording means for recording the coded signal on a recording medium while forming many tracks in parallel on the recording medium,
      wherein said variable-length coding means is arranged to adjust a compression ratio thereof in such a way as to make the coded signal corresponding to the digital video signal of m frames (m: an integer of 2 or more) have an amount of information recordable in n tracks (n: an integer of 1 or more) the coded signal corresponding to the digital video signal of each frame having a variable amount of information and each track having a fixed amount of information, an amount of the coded signal corresponding to the digital video signal of m frame is controlled to be equal to or less than the amount of information recordable in the tracks and code groups each corresponding to the digital video signal of m frames are respectively recorded on different track groups each having n tracks, with each track group being all the time recorded with a constant number of code groups.

2. An apparatus according to claim 1, wherein said variable-length coding means includes an orthogonal transforming circuit arranged to orthogonally transform the digital video signal and a quantizing circuit arranged to quantize output data of said orthogonal transforming circuit, and wherein the amount of information of the coded signal to be outputted from said variable-length coding means is adjusted by changing quantizing steps of said quantizing circuit.

3. An apparatus according to claim 2, wherein said variable-length coding means further includes a coding circuit arranged to variable-length code an output of said quantizing circuit, and a detecting circuit arranged to detect the amount of information of the coded signal outputted from said coding circuit.

4. An apparatus according to claim 1, further comprising marking means for recording a mark signal on the recording medium for every portion of the coded signal corresponding to the digital video signal for m frames.

5. An apparatus according to claim 4, wherein said marking means is arranged to record the mark signal in a track separate from tracks formed by said recording means.

6. A video signal recording apparatus comprising:
   a) input means for inputting a digital video signal;
   b) variable-length coding means arranged to compress an amount of information of the digital video signal and to output a coded signal having a variable length per unit amount of information;
   c) recording means for recording the coded signal on a recording medium while forming many tracks in parallel on the recording medium, wherein said variable-length coding means is arranged to adjust a compression ratio thereof in such a way as to make the coded signal corresponding to the digital video signal for m frames (m: an integer of 2 or more) have an amount of information recordable in n tracks (n: an integer of 1 or more), each frame having a variable amount of information and each track having a fixed amount of information, and said recording means records the coded signal corresponding to the digital video signal for m frames respectively on different n tracks; and
   d) marking means for recording a mark signal on the recording medium for every portion of the coded signal corresponding to the digital video signal for m frames and for recording on the recording medium control information which specifies a useless frame included in the m frames.

7. A video signal recording apparatus comprising:
   a) input means for inputting a digital video signal;
   b) variable-length coding means arranged to compress an amount of information of the digital video signal and to output a coded signal; and
   c) recording means for recording the coded signal on a recording medium while forming many tracks in parallel on the recording medium, wherein said variable-length coding means is arranged to adjust a compression ratio thereof in such a way as to make the coded signal corresponding to the digital video signal of m frames (m: an integer of 2 or more) have an amount of information equal to or less than an amount of information An recordable in n tracks (n: an integer of 1 or more), the coded signal corresponding to the digital video signal of each frame having a variable amount of information and each track having a fixed amount of information, and code groups each corresponding to the digital video signal of m frames are respectively recorded on different track groups each having n tracks, with each track group being all the time recorded with a constant number of code groups.

8. A video signal recording apparatus comprising:
   a) input means for inputting a digital video signal;
   b) variable-length coding means arranged to compress an amount of information of the digital video signal and to output a coded signal having a variable length per unit amount of information;
   c) recording means for recording the coded signal on a recording medium while forming many tracks in parallel on the recording medium; and
   d) marking means for recording, on the recording medium, control information specifying a useless frame among serial m frames (m: an integer of 2 or more) carried by the digital video signal, wherein said variable-length coding means is arranged to adjust a compression ratio thereof in such a way as to make the coded signal corresponding to the digital video signal for m frames (m: an integer of 2 or more) have an amount of information recordable in n tracks (n: an integer of 1 or more), each frame having a variable amount of information, said recording means records the coded signal corresponding to the digital video signal for m frames respectively on different n tracks.

9. A video signal recording apparatus comprising:
   a) input means for inputting a digital video signal;
   b) variable-length coding means arranged to compress an amount of information of the digital video signal and to output a coded signal; and
   c) recording means for recording the coded signal on a recording medium while forming many tracks in parallel on the recording medium,
      wherein said variable-length coding means is arranged to adjust a compression ratio thereof in such a way as to make the coded signal corresponding to the digital video signal of m frames (m: an integer of 2 or more) have an amount of information recordable in n tracks (n: an integer of 1 or more), the coded signal corresponding to the digital video signal of each frame having a variable amount of information and each track having a fixed amount of information,
      code groups each corresponding to the digital video signal of m frames are respectively recorded on different track groups each having n tracks, with one track group being all the time recorded with a constant number of code groups.

10. A video signal recording and reproducing apparatus comprising:
    a) input means for inputting a digital video signal;
    b) variable-length coding means arranged to compress an amount of information of the digital video signal and to output a coded signal having a variable length per unit amount of information;
    c) recording means for recording the coded signal on a recording medium while forming many tracks in parallel on the recording medium,
       wherein said variable-length coding means is arranged to adjust a compression ratio thereof in such a way as to make the coded signal corresponding to the digital video signal for m frames (m: an integer of 2 or more) have an amount of information recordable in n tracks (n: an integer of 1 or more), each frame having a variable amount of information,
       said recording means recording the coded signal corresponding to the digital video signal for m frames respectively on different n tracks;
    d) marking means for recording, on the recording medium, control information specifying a useless frame among serial m frames (m: an integer of 2 or more) carried by the digital video signal;
    e) reproducing means for reproducing the coded signal and the control information from the recording medium;
    f) decoding means arranged to decode the coded signal reproduced by said reproducing means and to restore the digital video signal to its original state; and
    g) output means for forming an output video signal from frames carried by the digital video signal restored by said decoding means, excluding said useless frame, in accordance with the control information.

11. A video signal recording and reproducing apparatus comprising:
    a) input means for inputting a digital video signal;
    b) variable-length coding means arranged to compress an amount of information of the digital video signal and to output a coded signal having a variable length per unit amount of information;
    c) recording means for recording the coded signal on a recording medium while forming many tracks in parallel on the recording medium,
       wherein said variable-length coding means is arranged to adjust a compression ratio thereof in such a way as to make the coded signal corresponding to the digital video signal for m frames (m: an integer of 2 or more) have an amount of information recordable in n tracks (n: an integer of 1 or more), each frame having a variable amount of information,
       said recording means records the coded signal corresponding to the digital video signal for m frames respectively on different n tracks;
    d) marking means for recording, on the recording medium, control information specifying a useless frame among serial m frames (m: an integer of 2 or more) carried by the digital video signal;
    e) reproducing means for reproducing the coded signal and the control information from the recording medium; and
    f) output means for forming an output video signal from frames carried by the coded signal reproduced by said reproducing means, excluding a coded signal portion corresponding to said useless frame, in accordance with the control information.

12. A video signal reproducing apparatus comprising
    a) reproducing means for reproducing a coded signal recorded on a recording medium,
       said coded signal being a signal obtained by variable-length coding of a digital video signal and recorded on a number of tracks located in parallel on said recording medium, wherein the variable length coding process is arranged to adjust a compression ratio thereof in such a way as to make the coded signal corresponding to the digital video signal of m frames (m: an integer of 2 or more) have an amount of information recordable in n tracks (n: an integer of 1 or more), the coded signal corresponding to the digital video signal of each frame having a variable amount of information and each track having a fixed amount of information, code groups each corresponding to the digital video signal of m frames are respectively recorded on different track groups each having n tracks, with one track group being all the time recorded with a constant number of code groups; and b) decoding means for decoding the coded signal reproduced by said reproducing means.

13. A method of recording a video signal comprising
a) inputting a digital video signal;
b) variable-length coding to compress an amount of information of the digital video signal and to output a coded signal; and
c) recording the coded signal on a recording medium while forming many tracks in parallel on the recording medium, wherein said variable-length coding adjusts a compression ratio thereof in such a way as to make the coded signal corresponding to the digital video signal of m frames (m: an integer of 2 or more) have an amount of information recordable in n tracks (n: an integer of 1 or more), the coded signal corresponding to the digital video signal of each frame having a variable amount of information and each track having a fixed amount of information, an amount of the coded signal corresponding to the digital video signal of m frame is controlled to be equal to or less than the amount of information recordable in the tracks and code groups each corresponding to the digital video signal of m frames are respectively recorded on different track groups each having n tracks, with each track group being all the time recorded with a constant number of code groups.

14. A method of recording a video signal comprising:
a) inputting a digital video signal;
b) variable-length coding to compress an amount of information of the digital video signal and to output a coded signal having a variable length per unit amount of information;
c) recording the coded signal on a recording medium while forming many tracks in parallel on the recording medium, wherein said variable-length coding is arranged to adjust a compression ratio thereof in such a way as to make the coded signal corresponding to the digital video signal for m frames (m: an integer of 2 or more) have an amount of information recordable in n tracks (n: an integer of 1 or more), each frame having a variable amount of information and each track having a fixed amount of information, and said recording records the coded signal corresponding to the digital video signal for m frames respectively on different n tracks; and
d) marking by recording a mark signal on the recording medium for every portion of the coded signal corresponding to the digital video signal for m frames and recording on the recording medium control information which specifies a useless frame included in the m frames.

15. A method for recording a video signal comprising:
a) inputting a digital video signal;
b) variable-length coding to compress an amount of information of the digital video signal and to output a coded signal; and
c) recording the coded signal on a recording medium while forming many tracks in parallel on the recording medium, wherein said variable-length coding adjusts a compression ratio thereof in such a way as to make the coded signal corresponding to the digital video signal of m frames (m: an integer of 2 or more) have an amount of information equal to or less than an amount of information An recordable in n tracks (n: an integer of 1 or more), the coded signal corresponding to the digital video signal of each frame having a variable amount of information and each track having a fixed amount of information, and code groups each corresponding to the digital video signal of m frames are respectively recorded on different track groups each having n tracks, with each track group being all the time recorded with a constant number of code groups.

16. A method of recording a video signal comprising:
a) inputting a digital video signal;
b) variable-length coding to compress an amount of information of the digital video signal and to output a coded signal having a variable length per unit amount of information;
c) recording the coded signal on a recording medium while forming many tracks in parallel on the recording medium; and
d) marking by recording, on the recording medium, control information specifying a useless frame among serial m frames (m: an integer of 1 or more), each frame having a variable amount of information, said recording records also boundary position information indicating boundary positions between the respective n tracks on said recording medium.

17. A method of recording a video signal comprising:
a) inputting a digital video signal;
b) variable-length coding to compress an amount of information of the digital video signal and to output a coded signal; and
c) recording the coded signal on a recording medium while forming many tracks in parallel on the recording medium, wherein said variable-length coding adjusts a compression ratio thereof in such a way as to make the coded signal corresponding to the digital video signal of m frames (m: an integer of 2 or more) have an amount of information recordable in n tracks (n: an integer of 1 or more), the coded signal corresponding to the digital video signal of each frame having a variable amount of information and each track having a fixed amount of information, code groups each corresponding to the digital video signal of m frames are respectively recorded on different track groups each having n tracks, with each track group being all the time recorded with a constant number of code groups.

18. A method of recording and reproducing a video signal comprising:

a) inputting a digital video signal;

b) variable-length coding to compress an amount of information of the digital video signal and to output a coded signal having a variable length per unit amount of information;

c) recording the coded signal on a recording medium while forming many tracks in parallel on the recording medium, wherein said variable-length coding adjusts a compression ratio thereof in such a way as to make the coded signal corresponding to the digital video signal for m frames (m: an integer of 2 or more) have an amount of information recordable in n tracks (n: an integer of 1 or more), each frame having a variable amount of information, said recording step recording the coded signal corresponding to the digital video signal for m frames respectively on different n tracks;

d) marking by recording, on the recording medium, control information specifying a useless frame among serial m frames (m: an integer of 2 or more) carried by the digital video signal;

e) reproducing the coded signal and the control information from the recording medium;

f) decoding the coded signal reproduced by said reproducing step to restore the digital video signal to its original state; and g) forming an output video signal from frames carried by the digital video signal restored by said decoding step, excluding said useless frame, in accordance with the control information.

19. A method of recording and reproducing a video signal comprising:

a) inputting a digital video signal;

b) variable-length coding to compress an amount of information of the digital video signal and to output a coded signal having a variable length per unit amount of information;

c) recording the coded signal on a recording medium while forming many tracks in parallel on the recording medium, wherein said variable-length coding adjusts a compression ratio thereof in such a way as to make the coded signal corresponding to the digital video signal for m frames (m: an integer of 2 or more) have an amount of information recordable in n tracks (n: an integer of 1 or more), each frame having a variable amount of information, said recording records the coded signal corresponding to the digital video signal for m frames respectively on different n tracks;

d) marking by recording, on the recording medium, control information specifying a useless frame among serial m frames (m: an integer of 2 or more) carried by the digital video signal;

e) reproducing the coded signal and the control information from the recording medium; and f) forming an output video signal from frames carried by the coded signal reproduced by said reproducing step, excluding a coded signal portion corresponding to said useless frame, in accordance with the control information.

20. A method of reproducing a video signal comprising:

a) reproducing a coded signal recorded on a recording medium, said coded signal being a signal obtained by variable-length coding of a digital video signal and recorded on a number of tracks located in parallel on said recording medium, wherein the variable length coding process is arranged to adjust a compression ratio thereof in such a way as to make the coded signal corresponding to the digital video signal of m frames (m: an integer of 2 or more) have an amount of information recordable in n tracks (n: an integer of 1 or more), the coded signal corresponding to the digital video signal of each frame having a variable amount of information and each track having a fixed amount of information, code groups each corresponding to the digital video signal of m frames are respectively recorded on different track groups each having n tracks, with each track group being all the time recorded with a constant number of code groups; and b) decoding the coded signal reproduced in said reproducing step.

* * * * *

UNITED STATES PATENT AND TRADEMARK OFFICE
CERTIFICATE OF CORRECTION

PATENT NO. : 5,911,033
DATED : June 8, 1999
INVENTOR(S) : Akio Fujii, et al.

It is certified that error appears in the above-identified patent and that said Letters Patent is hereby corrected as shown below:

Column 1, line 53, after "process", insert --,--.
Column 1, line 65, delete "a".
Column 5, line 26, delete "mutlilplexing" and insert --multiplexing--.
Column 7, line 12, delete "etch." and insert --etc.--.

Signed and Sealed this

Twelfth Day of September, 2000

Attest:

Q. TODD DICKINSON

*Attesting Officer*  *Director of Patents and Trademarks*